United States Patent [19]

Hayashi

[11] Patent Number: 5,122,717

[45] Date of Patent: Jun. 16, 1992

[54] APPARATUS FOR PRODUCING NC PROGRAMS USING MENU ICONS TO DEFINE OPERATIONS AND PRODUCING METHOD THEREOF

[75] Inventor: Akihiro Hayashi, Tokyo, Japan

[73] Assignee: Toshiba Kikai Kabushiki Kaisha, Tokyo, Japan

[21] Appl. No.: 602,646

[22] Filed: Oct. 24, 1990

[30] Foreign Application Priority Data

Nov. 10, 1989 [JP] Japan .................................. 1-293446

[51] Int. Cl.$^5$ .............................................. G05B 19/18
[52] U.S. Cl. .................................. 318/569; 318/568.13; 318/571; 364/192; 364/474.01; 364/DIG. 2
[58] Field of Search ........................... 318/560–646; 364/474.10–474.32, 200, 167, 192

[56] References Cited

U.S. PATENT DOCUMENTS

| | | | |
|---|---|---|---|
| 4,080,651 | 3/1978 | Cronshaw et al. | 364/200 |
| 4,101,960 | 7/1978 | Stokes et al. | 364/200 |
| 4,384,324 | 5/1983 | Kim et al. | 364/200 |
| 4,590,554 | 5/1986 | Glazer et al. | 364/200 |
| 4,606,001 | 8/1986 | Rieben et al. | 364/167 |
| 4,658,351 | 4/1987 | Teng | 364/200 |
| 4,688,167 | 8/1987 | Agarwal | 364/200 |
| 4,835,450 | 5/1989 | Suzuki | 318/568.13 |
| 4,847,751 | 7/1989 | Nakade et al. | 364/200 |
| 4,851,992 | 7/1989 | Nakayama | 364/200 |
| 4,860,191 | 8/1989 | Nomura et al. | 364/200 |
| 4,860,207 | 8/1989 | Kubo | 364/424.01 |
| 4,956,771 | 9/1990 | Neustaedter | 364/200 |
| 4,985,831 | 1/1991 | Dulong et al. | 364/200 |
| 4,999,553 | 3/1991 | Seraji | 318/561 X |

*Primary Examiner*—Paul Ip
*Attorney, Agent, or Firm*—Cushman, Darby & Cushman

[57] ABSTRACT

An apparatus for producing a numerical control program, which uses a unit motion pattern icon. A menu memory unit stores a menu of unit motion patterns corresponding to subdivided machine motions, a task memory unit for storing process programs for converting each unit motion pattern to each numerical control program; a display unit for displaying the menu of the unit motions; a task controller for reading the corresponding process program, outputting a parameter guidance corresponding to the unit motion pattern, and converting the unit motion to the corresponding numerical control program; and input unit for appointing a unit motion patterns and inputting a parameter; and NC program file for storing the numerical control program. A method for producing a numerical control program, which subdivides machine motion into unit motion, comprising the steps of subdividing machine into motion patterns, display the unit motion patterns as a menu, appointing a unit motion pattern, converting the unit motion pattern to a part of the numerical control program, repeating from the display step through the converting step, and combining each part of the numerical control program.

14 Claims, 3 Drawing Sheets

FIG. 2

| (INTERACTIVE FUNCTION) | 1. WORKPIECE MATERIAL | 2. UNIT SYSTEM INCH METRIC | 3. PROGRAM NAME / NUMBER | | | | | | | |
|---|---|---|---|---|---|---|---|---|---|---|
| | | | [TOOL PATH PATTERN] | | | | | | | |
| | | | X-Y ⟨G01⟩ | X-Y ⟨G00⟩ | ⟨G02⟩ | ⟨G03⟩ | CONNECTION | | | |
| | | | Z ⟨G01⟩ | Z ⟨G00⟩ | NC PROGRAM CALL | NC CODE INPUT PICTURE | MOVEMENT TO TOOL CHANGE POSITION | | | |
| | | | PLANE | POCKET | SIDE PLANE | DRILL | BORING | | | |
| | | | REAMING | CONTOURING | CHAMFERING | FLUTING | USER PATTERN CALL | | | |
| | | | [AUXILIARY FUNCTION] | | | | | | | |
| | | | TOOL SET | SPINDLE ROTATION/STOP | PALLET ROTATION | MACHINING CONDITION | MACHINING PROCESS | | | |
| | | | TOOL TABLE DISPLAY | MACHINING PRIORITY | COORDIN-ATES | PLANE DEFINITION | | | | |
| | TOOL NUMBER | TOOL NAME | PROCESS INTERNAL | Z VALUE | SPINDLE ROTATION | FEED SPEED | | | | |
| JOB NAME | CONFIRMATION | REG/RECALL | ALTERNATION | REVERSE ⟨UNDO⟩ | FUNCTION ⟨HELP⟩ | STOP/END | | | | |
| JOB NUMBER | EDIT | | | | | | | | | |
| DISPLAY CHANGE | | | | | | | | | | |

APPARATUS FOR PRODUCING NC PROGRAMS USING MENU ICONS TO DEFINE OPERATIONS AND PRODUCING METHOD THEREOF

BACKGROUND OF THE INVENTION

1. Field of the Invention

This invention relates to an apparatus for producing numerical control (NC) programs which are used in numerical control apparatus to machine a workpiece, and also relates to a producing method thereof.

2. Description of the Related Art

Machining programs (NC programs) are used in numerical control (NC) apparatus, which control a machine tool or the like. Several kinds of apparatus have been used for producing numerical control programs. These apparatus include for example, an editer operating in a computer numerical control (CNC) apparatus, an interactive programming apparatus integrated with a CNC apparatus, and a programming system operating in a personal computer or in a work station which is independent of a numerical control apparatus.

When a numerical control program is produced, however, the operator needs to be very familiar with the format and code of the numerical control program, or the software of these apparatus to handle all of the functions provided thereto.

Accordingly, there is much difficulty if the operator is inexperienced.

Functions provided by these programming apparatus do not always meet a user's expectations, and revision of the numerical control program produced by these programming apparatus has been requested to fit to each end users program in some cases.

For example, if an opening is to be made by boring, a tool is fed in a vertical direction with rotation. When this process ends, the tool must be pulled out. In such a case, there are several patterns, for example, 1. The tool is pulled out after stopping its rotation.
2. The tool is pulled out with a rotating motion.
3. 1) or 2) are used after the tool is retracted from a cutting surface.

If the programming apparatus provides only one pattern of these three patterns, the numerical control program can not be produced.

Motion patterns produced by a interactive programming system or automatic programming system is produced by the program that works in those systems. Accordingly these systems can produce only numerical control programs based on these programs stored in the systems.

Further a general purpose numerical control apparatus which is used by many users, or which is used for several kinds of workpieces, can not provide a programming apparatus which is sufficient to perform all of these items.

Normally the stored control program of these programming apparatus is not disclosed to users. Accordingly, if the program produced by these apparatus is not sufficient to meet all the user's wishes, changing these control programs to fit their requests is very difficult.

If the manufacturer of these systems revise the control program to fit to user's requests, this process takes a lot of time. Moreover, it is difficult to revise in correspondence to all requests from users.

When a user revises a NC machining program produced by these programming systems, there are also difficulties. In particular, the outputs of these systems are written in numerical control program codes, so that the user must locate the portion in need of revision in the raw program of the numerical control programming codes. It is also difficult to locate all of the portions in need of revision in these codes. These difficulties are mainly caused by the lack of detailed response in these related art programming systems. In particular, these programming systems lack a correspondence between detailed machine motions, and the NC program code. As a result, it becomes difficult to correspond to motions of machines.

Accordingly, it has been desirable to provide an apparatus for producing numerical control programs, which can correspond to detailed machine motions and fit to the motions.

SUMMARY OF THE INVENTION

It is an object of the present invention to provide an apparatus for producing NC programs which are able to correspond to detailed machine motions and to fit to the motions.

It is another object of the present invention to provide a facilitated method for producing NC programs which is able to produce NC programs for an operator of the programming system.

According to the present invention, there is provided an apparatus for producing NC programs, comprising a menu memory unit for storing a menu of unit motion patterns corresponding sub-divided machine motion; a task memory unit for storing process programs for converting each unit motion pattern to each numerical control program; a display unit for displaying the menu of the motions output from the menu memory unit; a task controller for reading the corresponding process program from the task memory unit, outputting a parameter guidance corresponding the unit motion pattern assigned by a operator to the display unit, and converting the unit motion to the corresponding numerical control program; an input unit for assigning unit motion patterns and inputting a parameter in accordance with the parameter guidance to the task controller for converting the unit motion pattern; and an NC program file for storing the numerical control program converted by the task controller.

According to another aspect of the present invention there is provided a method for producing a numerical control program for controlling a numerical controlled machine, comprising the steps of subdividing machine motions to a unit motion pattern; displaying the unit motion pattern as a menu for appointing to produce a part of the numerical control program; assigning a unit motion pattern in the menu; converting the unit motion pattern to a part of the numerical control program; repeating from the displaying step through the converting step to produce the numerical control program; and combining each part of the numerical control program to produce the numerical control program.

BRIEF DESCRIPTION OF THE DRAWINGS

The invention can be fully understood by reference to the accompanying drawings in which:

FIG. 2 shows an example of the menu picture displayed on the display unit; and

DESCRIPTION OF THE PREFERRED EMBODIMENTS

The preferred embodiment of the present invention will now be described in more detail with reference to the accompanying drawings.

Figure 1:
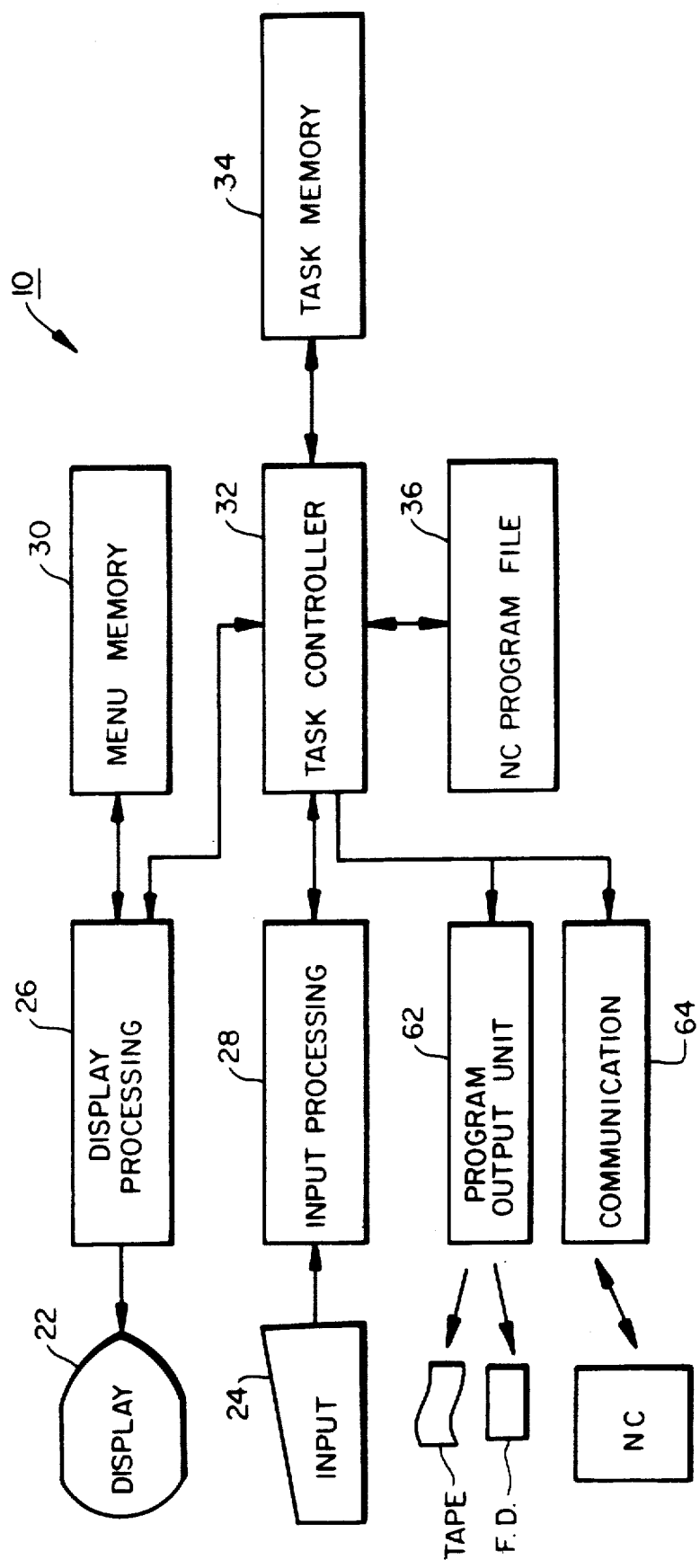
FIG. 1 shows a structural block diagram of the apparatus for producing NC programs of the present invention.

The structured block diagram of the apparatus for producing numerical control (NC) programs of the present invention is shown in FIG. 1.

An apparatus for producing NC programs 10 of the present invention includes display unit 22, display processing unit 26, input unit 24, and input processing unit 28. Apparatus for producing NC programs 10 also includes menu memory unit 30, task controller 32, task memory unit 34, and NC program file unit 36.

The present invention subdivides the motion of the machine controlled by a NC apparatus into multiple motion patterns. Each motion pattern used in the present invention is called a unit motion patterns. Each unit motion pattern defines a detailed particular motion of a machine. Further a menu item called a menu icon is defined to correspond to each unit motion pattern.

Accordingly one menu icon corresponds to each unit motion pattern and each motion pattern represents one detailed motion of the machine tool which is controlled by a numerical control apparatus.

Display unit 22 displays several menu icons as described above and is connected to display processing unit 26. A CRT display or a liquid crystal display is used as a man machine communication device in the display unit 22.

Display processing unit 26 is further connected to task controller unit 32 and menu memory unit 30, and controls data from task controller 32 and menu memory unit 30 to display the menu icons and other data on display unit 22.

Menu memory unit 30 stores a list of several menu items as a menu icon list. Menu memory unit 30 is connected to display processing unit 26 and information therefrom is sent in response to a command from task controller 32.

Input unit 24 includes a mouse controller, key board switches and the like. The operator can select a menu using these devices of input unit 24. Input unit 24 is connected to input processing unit 28 and information from the input unit 24 is sent thereto.

Input processing unit 28 receives the information input by the operator and sends it to task controller unit 32.

Task memory unit 34 stores the process programs used by this apparatus and the process program used by task controller unit 32. The process program includes a conversion program, program data, and parameter input display data.

The conversion program converts each unit motion pattern along with corresponding program data to a corresponding numerical control program.

The parameter input display data are used for displaying input guidance instruction to help the user enter proper parameters. Each unit motion pattern needs certain parameters for processing.

Once a menu item is selected by the operator, task controller unit 32 reads out a conversion program corresponding to the selected menu item from task memory unit 34. Task controller 32 also controls displaying the proper input guidance instruction for parameters and input parameters. Further, task controller unit 32 converts the selected unit motion pattern to a corresponding numerical control program using the program data and the selected parameter.

NC program file unit 36 is connected to task controller unit 32 and stores NC programs converted by task controller unit 32.

The apparatus for producing numerical control programs of the present invention also provides program output unit 62 and communication unit 64.

Program output unit 62 outputs the numerical programs as a paper tape or another type of medium, such as a flexible disk.

Communication unit 64 communicates to another processing unit such as a personal computer or a numerical control apparatus or the like. It sends and receives numerical control programs to each other.

The apparatus for producing NC program of the present invention is basically constructed as described above and the operation of the apparatus is described next.

When the operator turns on the apparatus to produce a numerical control program, display processing unit 26 reads the menu icon list which is stored in menu memory unit 30. The menu list, then, is displayed on a screen of display unit 22.

FIG. 2 shows the menu icon list which is displayed on the screen of display unit 22. Motions of the machine tool controlled by a numerical control apparatus are subdivided into unit motion patterns represented by icons 40a through 40x and these icons 40a through 40x are displayed on the screen of display unit 22. These icons 40a through 40x are generally divided into two groups.

The first group represents tool path patterns. These include, for example, the icon for linear interpolation (G01) 40a, the icon for positioning 40b, the icon for circular interpolation right (G02) 40c, pocket form 40l, and other tool path patterns which can be used by the NC machine.

The second group represents auxiliary functions for the machine. These are statement icons which only require a letter to be input such as process interval 40x. For example, when the data for a tool is input, "tool set" 40n is selected.

Figure 3:
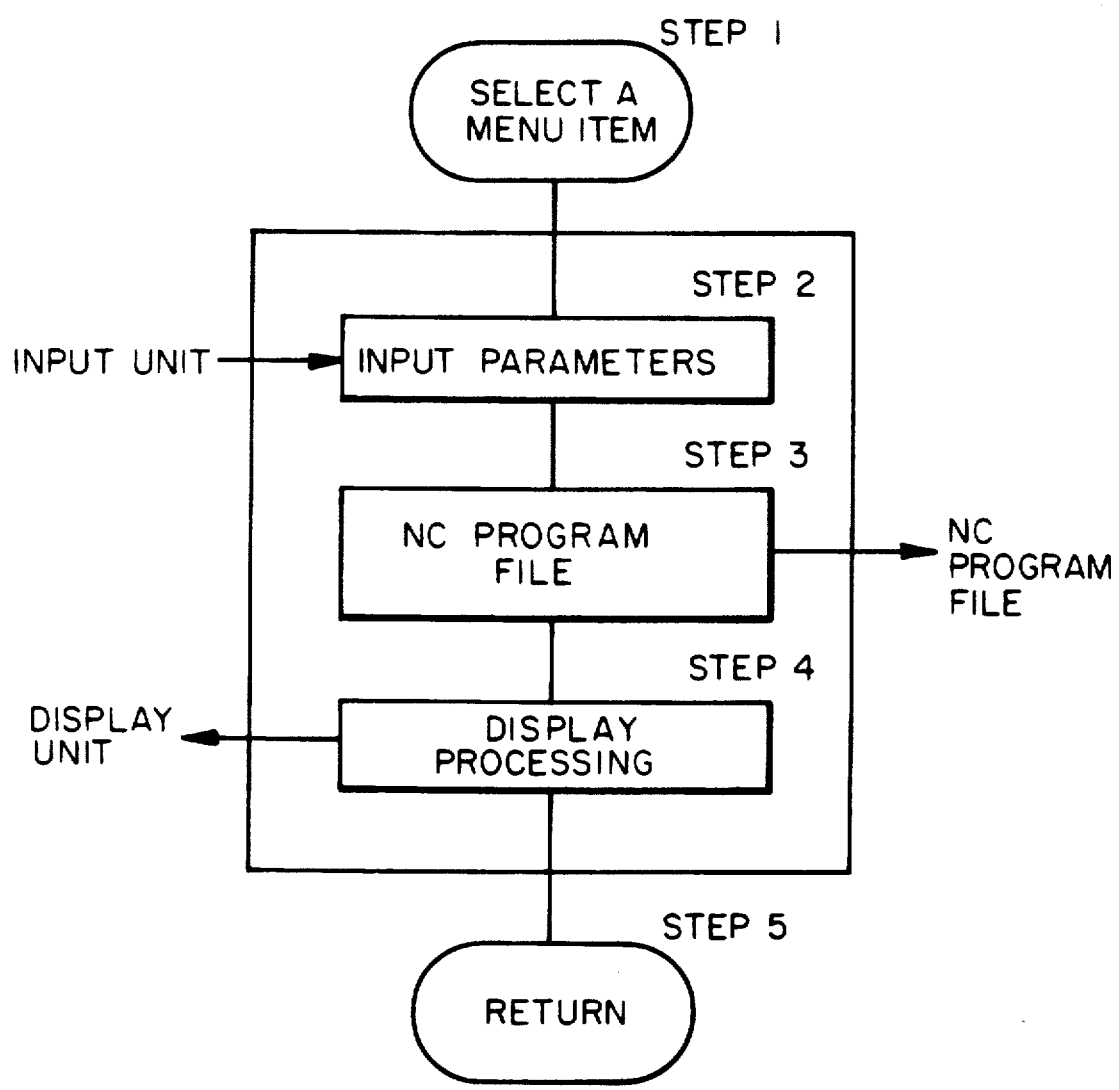
FIG. 3 is a flow chart of the process procedure in the apparatus for producing NC program of the present invention.

Each time an icon is selected by the operator the process of the flow chart shown in FIG. 3 is executed.

(STEP 1)

The operator selects a unit motion pattern, which is desired to be executed by an NC apparatus, from the menu picture of display 22. A mouse or keyboard input device is used for this selection via the operator determining an icon and indicating that this icon should be entered. Input processing unit 28 passes the menu item to task controller unit 32. Task controller unit 32 reads a process program corresponding to the unit motion pattern for the selected menu item from task memory unit 34 and executes the process program based thereon.

The process program read from task memory unit 34 includes the program data, the conversion program and the parameter input display data corresponding to the unit motion pattern for the icon as described before.

The process of task controller unit 32 includes step 2 through step 4 of FIG. 3.

(STEP 2)

A message for parameter input guidance is displayed on display unit 22 in order to input parameters for execution of the unit motion pattern corresponding to the icon selected by the operator in step 1. The message is displayed via display processing unit 26.

The operator reads this parameter input guidance and inputs parameters via input unit 24. The parameters are those needed for execution of the unit pattern motion for the NC apparatus. The unit pattern motion is, of course, selected by the operator.

An example of the process is described next. When the operator selects a tool set icon (tool set 40n), the NC apparatus needs to know which tool. Therefore, a tool number must be requested. The parameter input guidance for the apparatus indicates that a tool number to change must be input when this unit motion pattern (40n) is executed.

When the operator requests the NC apparatus to execute a unit motion for moving to a fixed position or for going or returning to a region, one of icons 40a through icon 40x must be selected. The operator assigns icons from input unit 24.

For example, when icon 40c is selected, parameters for the starting point coordinates, the ending point coordinates of a circle, and the radius of a circle are needed. An appropriate parameter input guidance message is input, and these parameter values are input by the operator using input unit 24.

(Step 3)

Task controller unit 32 responds to the selected icon and converts it to an NC program. The task controller 32 converts the icon and the program data, using the conversion program for the unit motion pattern corresponding to the icon and the parameters input in step 2.

(Step 4)

The converted NC program is displayed on the display screen of the display unit 26 by task controller 32 via display processing unit 26.

(Step 5)

If the converted and displayed NC program segment is as the operation wishes, the operator commands to return using the mouse or a keyboard switch in input unit 24. The NC program produced by the system is stored in the NC program file 36 and the status of the NC programming apparatus is initialized. The NC programming apparatus goes to its initialized status and the menu picture of FIG. 2 is displayed on display unit 22. The operator then repeats steps 1 through 5 to produce another NC program segment by assigning the next unit motion pattern (icon). As a result, the operator can make a new NC program segment which defines a series of the machine motions controlled by an NC apparatus.

The numerical control program produced by the system is output via output unit 60, such as a paper tape punch unit or flexible disk drive unit or the like, by the control of task controller 32.

The numerical control program output by output unit 62 is used in a numerical control apparatus which controls a machine tool or the like.

The numerical control program produced by the apparatus of the present invention can be sent electrically by communication unit 64, such as ISO RS-232, RS-422 or the like, to another system.

A microprocessor could be used to realize the present invention, such as a 16-bit or a 32-bit processor. If the RISC (Reduced instruction set computer) is used as the heart of the task controller 32, the conversion speed may be improved.

Semiconductor memories such as a ROM:Read only memory, or RAM, random access read/write memory may also be used in memory units of the present invention. Menu memory unit 32 includes ROM for storing the menu of unit motions. Task controller also uses ROM.

NC program file 36 includes RAM for storing numerical control program converted by task controller 32.

As described above, according to the apparatus for producing numerical control programs of the present invention, machine motions are subdivided into unit motion patterns, and a process program having program data, conversion program and parameter input guidance data are stored. When an operator produces a numerical control program, a menu picture having many unit motion patterns are displayed on the display screen. Parameters are also input by the operator to produce a suitable numerical control program. The operation by the operator for producing the numerical control program for a series of machine motions is repeated using several kinds of unit motion patterns.

Accordingly, the operator or the user of this apparatus of the present invention can easily produce a numerical control program selecting the unit motion patterns in order.

Further, if the operator requests to revise the numerical control program produced by the apparatus, the operator can locate the point for revision because of the arrangement of the unit motion patterns. This facilitates revision of the numerical control program.

In summary, this invention provides an apparatus for producing numerical control program easily.

What is claimed is:

1. An apparatus for producing a numerical control program, comprising:
   a menu memory unit for storing a menu of unit motion patterns, each corresponding to a subdivided machine motion;
   a display unit for displaying a menu of the unit motions stored in the menu memory unit;
   a task memory unit for storing process programs for converting each said unit motion pattern to a numerical control program segment indicative of the unit motion pattern;
   a task controller for receiving an indication of a selected unit motion pattern, reading a process program from the task memory unit corresponding to the selected unit motion pattern, and for outputting a parameter guidance instruction corresponding to the selected unit motion pattern to the display unit, and for converting the unit motion pattern to a corresponding numerical control program;
   an input unit for assigning said selected unit motion pattern and inputting a parameter in accordance with the parameter guidance instruction to the task controller for converting the unit motion pattern; and
   an NC program file for storing the numerical control program converted by the task controller.

2. The apparatus of claim 1, wherein each said process program stored in the task memory unit includes;

a conversion program for converting a unit motion pattern to a corresponding numerical control program segment;

a parameter input instruction, including information guiding the operator to input a proper parameter for said unit motion pattern; and program data for producing a numerical control program corresponding to said unit motion pattern and said proper parameter.

3. The apparatus of claim 1, wherein said input unit includes a mouse device unit for selecting the unit motion pattern; and a input processing unit for processing input data using the mouse device unit to the task controller.

4. The apparatus of claim 1, wherein said input unit includes a keyboard input device for selecting the unit motion pattern and inputting a parameter corresponding to the parameter guidance instruction.

5. The apparatus of claim 1, wherein said display unit includes a CRT display unit for displaying the menu of the unit motion; and a display processing device for controlling data from the menu memory unit and commands from the task controller unit.

6. The apparatus of claim 1 further comprising means for outputting a numerical control program stored in the numerical control program file.

7. The apparatus of claim 6, wherein said output device includes a paper tape puncher for outputting a paper tape having a numerical control program data.

8. The apparatus of claim 6, wherein said output device includes a flexible disk drive unit for externally storing the numerical control programs stored in the numerical control program file.

9. The apparatus of claim 6, wherein said output device includes a telecommunication unit for sending data of the numerical control program to an external device.

10. An apparatus for producing a numerical control program, comprising:

first means for displaying a menu of unit motion patterns each corresponding to a subdivided machine motion;

second means for selecting a selected unit motion pattern and parameters associated therewith;

third means for receiving an indication of said selected unit motion pattern and for outputting a parameter guidance instruction corresponding to the selected unit motion pattern to the first means to be displayed thereon; and input means for receiving input of a parameter corresponding to said parameter guidance instruction, said third means receiving said parameter from said input means and converting the unit motion pattern and said parameter to a corresponding numerical control program.

11. A method for producing a numerical control program for controlling a numerically controlled machine; comprising the steps of:

subdividing motions of an NC machine to a unit motion pattern;

displaying a menu of the unit motion patterns;

assigning a unit motion pattern in the menu to produce a part of the numerical control program;

displaying a parameter guidance instruction corresponding to the assigned unit motion pattern which guides input of a parameter associated with said assigned unit motion pattern;

receiving an input parameter corresponding to said input guidance instruction;

converting the unit motion pattern and said input parameter to a part of the numerical control program;

repeating from the displaying step through the converting step to produce additional parts of a numerical control program; and combining each said part of the numerical control program to produce a complete numerical control program.

12. The method of claim 11 wherein said display step includes the step of displaying tool path pattern icons on the basis of a motion of machine tools.

13. The method of claim 12, wherein said displaying step includes the step of displaying a pocket machining motion, a boring motion, a reaming motion and a fluting motion.

14. The method of claim 12, wherein said display step includes the step of displaying a user pattern requested by a customer.

* * * * *